United States Patent
Faye et al.

(10) Patent No.: US 11,246,071 B2
(45) Date of Patent: Feb. 8, 2022

(54) METHOD FOR MANAGING A CONNECTION IN A DISTRIBUTED WIRELESS NETWORK

(71) Applicant: SAGEMCOM BROADBAND SAS, Rueil Malmaison (FR)

(72) Inventors: Stanislas Faye, Rueil Malmaison (FR); Farid Zaouia, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/973,562

(22) PCT Filed: Jun. 25, 2019

(86) PCT No.: PCT/EP2019/066911
§ 371 (c)(1),
(2) Date: Dec. 9, 2020

(87) PCT Pub. No.: WO2020/002376
PCT Pub. Date: Jan. 2, 2020

(65) Prior Publication Data
US 2021/0250827 A1    Aug. 12, 2021

(30) Foreign Application Priority Data
Jun. 28, 2018  (FR) ..................... 1855829

(51) Int. Cl.
*H04W 4/00*     (2018.01)
*H04W 36/00*    (2009.01)
*H04W 36/30*    (2009.01)

(52) U.S. Cl.
CPC . *H04W 36/0085* (2018.08); *H04W 36/00837* (2018.08); *H04W 36/30* (2013.01)

(58) Field of Classification Search
None
See application file for complete search history.

(56) References Cited

U.S. PATENT DOCUMENTS

| | | | |
|---|---|---|---|
| 8,089,939 B1 | 1/2012 | Mater et al. | |
| 9,538,446 B1 | 1/2017 | Kaushik | |
| 2017/0135104 A1 | 5/2017 | Emmanuel et al. | |
| 2018/0084471 A1 | 3/2018 | Emmanuel et al. | |
| 2018/0124656 A1* | 5/2018 | Park ................. | H04W 36/0072 |

OTHER PUBLICATIONS

Aug. 12, 2019 International Search Report issued in International Patent Application No. PCT/EP2019/066911.

* cited by examiner

*Primary Examiner* — Suhail Khan
(74) *Attorney, Agent, or Firm* — Oliff PLC; R. Brian Drozd (57) ABSTRACT

A method, for a distributed wireless communication network, for managing the connection of a client node to a first gathering node is provided. A quality indicator presenting a quality of the connection is determined. If the quality indicator indicates a poor quality, then: to each gathering node of the network, a command to collect quality data is sent, messages comprising the quality data are received, for each gathering node, a quality indicator is determined, and a second gathering node according to the quality indicators determined is selected. If the second gathering node is different from the first gathering node, then to each gathering node, except for the second gathering node, a command to refuse association with the client node is sent.

11 Claims, 4 Drawing Sheets

METHOD FOR MANAGING A CONNECTION IN A DISTRIBUTED WIRELESS NETWORK

The present invention relates to the field of wireless communication networks complying with one of the IEEE 802.11 standards (Institute of Electrical and Electronics Engineers), that is to say the wireless communication networks commonly referred to as Wi-Fi networks. The present invention relates more particularly to a method for managing the connection of a client node to a gathering node in a distributed Wi-Fi network.

A wireless communication network (hereinafter "network") complying with one of the IEEE 802.11 standards typically comprises a plurality of nodes. Each node is an electronic device comprising at a minimum a radio-frequency module for establishing communications in accordance with one of the IEEE 802.11 standards, or in other words in accordance with one of the Wi-Fi standards. Such a network typically comprises a so-called master electronic node or device, commonly referred to as an access point (AP), and a plurality of so-called user (or client) electronic devices or nodes able to establish wireless connections with the access point and/or with one another. In a residential environment, the master electronic device, or access point, is typically a box provided by an internet operator, that is to say a home gateway or residential gateway. The user electronic devices are typically computers, televisions, tablets or so-called smartphones. It is also commonly said that the user electronic devices are associated or connected "in Wi-Fi" with the access point.

The architecture of a Wi-Fi network may also be a so-called distributed architecture, in order for example to extend the range of the wireless network or to increase the performance thereof, by the use of a plurality of access points. The architecture of a distributed Wi-Fi network typically comprises two networks:
- a first so-called gathering or backhaul network, for connecting the access points to one another and constituting a network infrastructure in accordance with a network architecture of the mixed star and/or chain type, this gathering network being able to be a wireless network (for example Wi-Fi), a cabled network (for example Ethernet) or a mixture of the two,
- a second so-called user (or client) network (fronthaul network), allowing a connection of so-called user (or client, or station) nodes (or electronic devices) to the distributed Wi-Fi network.

Figure 1:
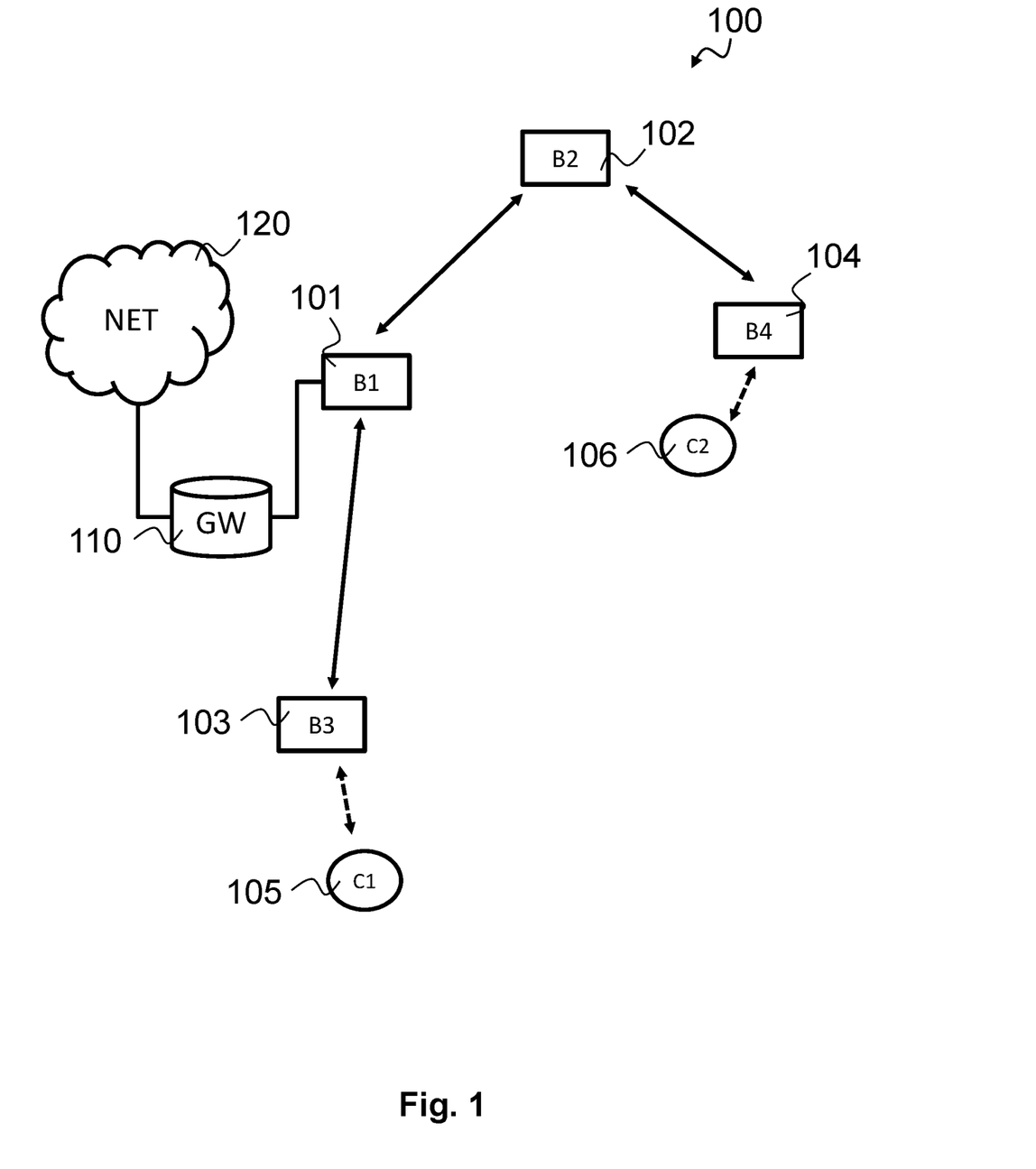
FIG. 1 illustrates schematically the architecture of a distributed wireless communication network comprising a plurality of nodes, for example compliant with an IEEE 802.11 standard.

FIG. 1 illustrates highly schematically such a distributed Wi-Fi network 100. The distributed network 100 comprises a gateway 110 and a plurality of electronic nodes or devices B1 101, B2 102, B3 103, B4 104, C1 105 and C2 106. The gateway 110 allows an interconnection of the network 100 with a network 120, for example the internet. In this example, the nodes B1, B2, B3 and B4 are so-called gathering nodes. These nodes B1, B2, B3 and B4 constitute the gathering (backhaul) infrastructure of the network 100. The nodes C1 and C2 are two client nodes connected to gathering nodes (respectively the nodes B3 and B4). The gathering nodes B1, B2, B3 and B4 typically manage two Wi-Fi networks:
- a first Wi-Fi network, dedicated to gathering, allows a connection of each gathering node to the distributed network 100, possibly in a concatenated fashion,
- a second Wi-Fi network is dedicated to the connection of the client nodes to one or other of the gathering nodes, in a similar fashion to a non-distributed Wi-Fi network.

In the example illustrated in FIG. 1, the node B1 101 is connected by cable to the gateway GW 110, for example via an Ethernet connection. According to one embodiment, the connection between the gateway GW 110 and the node B1 101 can be made via a Wi-Fi connection. According to one embodiment, the gateway GW 110 and the node B1 101 are one and the same electronic device, said electronic device comprising the functionalities of the gateway GW 110 and of the node B1 101.

Each gathering node B1, B2, B3 or B4 can therefore possibly establish a connection to another gathering node in order to constitute the backhaul infrastructure of the distributed network 100. It should be noted that, according to one embodiment, some gathering nodes may be connected via a cable connection, for example of the Ethernet type, to the backhaul network.

A user node, such as the user node C1 or the user node C2, can therefore potentially establish a wireless connection with one or other of the gathering nodes B1, B2, B3 or B4. Typically, a client node seeks to establish a wireless connection with the gathering node that is emitting the strongest radio signal. In other words, a client node seeks to establish a wireless connection with a gathering node among the plurality of gathering nodes available, the gathering node corresponds to the gathering node the radio signal of which is received with the greatest power by the client node.

This choice is often not the optimum choice from the point of view of the distributed communication network. This is because the gathering node chosen by a client node for connecting may certainly be the one offering the best quality of reception of the radio signal, but this gathering node may moreover be overloaded in terms of number of client nodes already connected or gathering traffic passing through this node. It might be optimum in this case for the client node to connect to another less loaded gathering node even if the latter in principle offers a less good quality of radio signal.

More prosaically, the client node is the only decider on the gathering node used to connect to the network, and it is not possible to establish, for a distributed wireless communication network, a centralised strategy of connection of the client nodes to the various gathering nodes.

It is therefore necessary to propose a method for overcoming these drawbacks.

The invention relates to a method, for a distributed wireless communication network comprising a plurality of gathering nodes and at least one client node connected to a first gathering node, for managing the connection of this client node, the method being executed by a so-called management node and comprising the steps of:
- determining a connection quality indicator associated with the client node, the connection quality indicator representing a quality of the connection between the first gathering node and the client node,
- if the connection quality indicator is above a predetermined threshold, this exceeded threshold representing a poor quality of the connection, then:
- sending, to each gathering node, except for the first gathering node, a command to activate the determination of a quality data item associated with the client node and with said gathering node, the command comprising an identifier of the client node,
- receiving, coming from each gathering node, a message comprising the quality data associated with the client node and with said gathering node, determining, for each gathering node, a quality indicator associated with the client node according to the quality data received, selecting a second gathering node according to the quality indicators determined, and if the second gathering node is different from the first gathering node, then:

sending, to each gathering node of the distributed communication network, apart from the second gathering node, a command refusing association with the client node.

According to a complementary embodiment of the invention, if the second gathering node is different from the first gathering node, then the method comprises a step of sending, to the client node, a command to connect to the second gathering node, the command comprising an identifier of the second gathering node, the step of sending, to each gathering node of the distributed communication network, apart from the second gathering node, a command refusing association with the client node being performed only in the absence of acceptance by the client node of the previous command for connection to the second gathering node.

According to a complementary embodiment of the invention, if the connection quality indicator is above a predetermined threshold, this exceeded threshold representing a poor quality of the connection, then the method comprises a step of sending, to the client node, a command for determining quality data associated with each gathering node, the steps of sending, to each gathering node, apart from the first gathering node, an activation command for determining quality data associated with the client node and with said gathering node and for receiving, coming from each gathering node, a message comprising the quality data associated with the client node and with said gathering node, being performed only in the absence of acceptance by the client node of the previous command for determining the quality data associated with each gathering node.

According to a complementary embodiment of the invention, each gathering node being connected to the same communication bus, each gathering node collects, for each client node connected to said gathering node, quality data.

According to a complementary embodiment of the invention, the so-called management node is one of the gathering nodes.

According to a complementary embodiment of the invention, the distributed wireless communication network is compliant with an IEEE 802.11 standard.

The invention also relates to a management node of a distributed wireless communication network, the communication network comprising a plurality of gathering nodes, the management node being characterised in that it is adapted for executing all or some of the steps of the method described in the present document.

The invention also relates to a method, for a distributed wireless communication network comprising a plurality of gathering nodes and at least one client node connected to a first gathering node, for managing the connection of this client node, the method being executed by a gathering node and comprising the steps of:

receiving, coming from a so-called management node, a command for activating the determination of quality data associated with the client node, the command comprising an identifier of the client node, determining the quality data associated with the client node, sending, to the management node, a message comprising the quality data associated with the client node and with the gathering node.

According to a complementary embodiment of the invention, the gathering node comprising at least one radio module compliant with an IEEE 802.11 standard, the step of determining the quality data associated with the client node comprises:

changing the radio module to a so-called monitoring mode in order to capture frames comprising the identifier of the client node, and/or filtering frames received according to the identifier of the client node, the quality data corresponds to a received power of a radio signal corresponding to the frames captured or received.

The invention also relates to a gathering node of a distributed wireless communication network, the communication network comprising a plurality of gathering nodes, the gathering node being adapted for executing all or some of the steps of the method described in the present document.

The invention also relates to a computer program, which can be stored on a medium and/or downloaded from a communication network, in order to be read by a processor of a node of a distributed wireless communication network. This computer program comprises instructions for implementing all or some of the steps of the method for managing the connection of a client node to the communication network, when said program is executed by the processor.

The invention also relates to an information storage medium or recording medium, which can be read by or is accessible to a node of a distributed wireless communication network comprising such a computer program.

The features of the invention mentioned above, as well as others, will emerge more clearly from a reading of the following description of an example embodiment, said description being made in relation to the accompanying drawings, among which.

The invention makes it possible to overcome the lack of functionality of the "handover" type in a typical network of the Wi-Fi type. The invention makes it possible to determine whether it is necessary to transfer a connection from a client node established with a first gathering node to another gathering node. If such is the case, the invention discloses a method for selecting another gathering node more adapted to the connection of the client node, according to a variety of criteria not limited solely to the power of a radio signal received. Finally, the invention makes it possible to transfer the connection between the client node and the first gathering node to a second gathering node. Advantageously, the invention relates to a method adapted both to client nodes compliant with an IEEE 802.11k and/or IEEE 802.11v standard and to nodes not compliant with these two standards.

In the methods 200 and 300 illustrated below in FIG. 2 and FIG. 3, the network 100 comprises a so-called management node. The functions of said management node may be integrated in one of the gathering nodes of the network 100, for example the so-called central node B1 101, or be integrated in a dedicated electronic device of the network 100. According to another embodiment of the invention, these functions may be integrated in the gateway 110.

Figure 2:
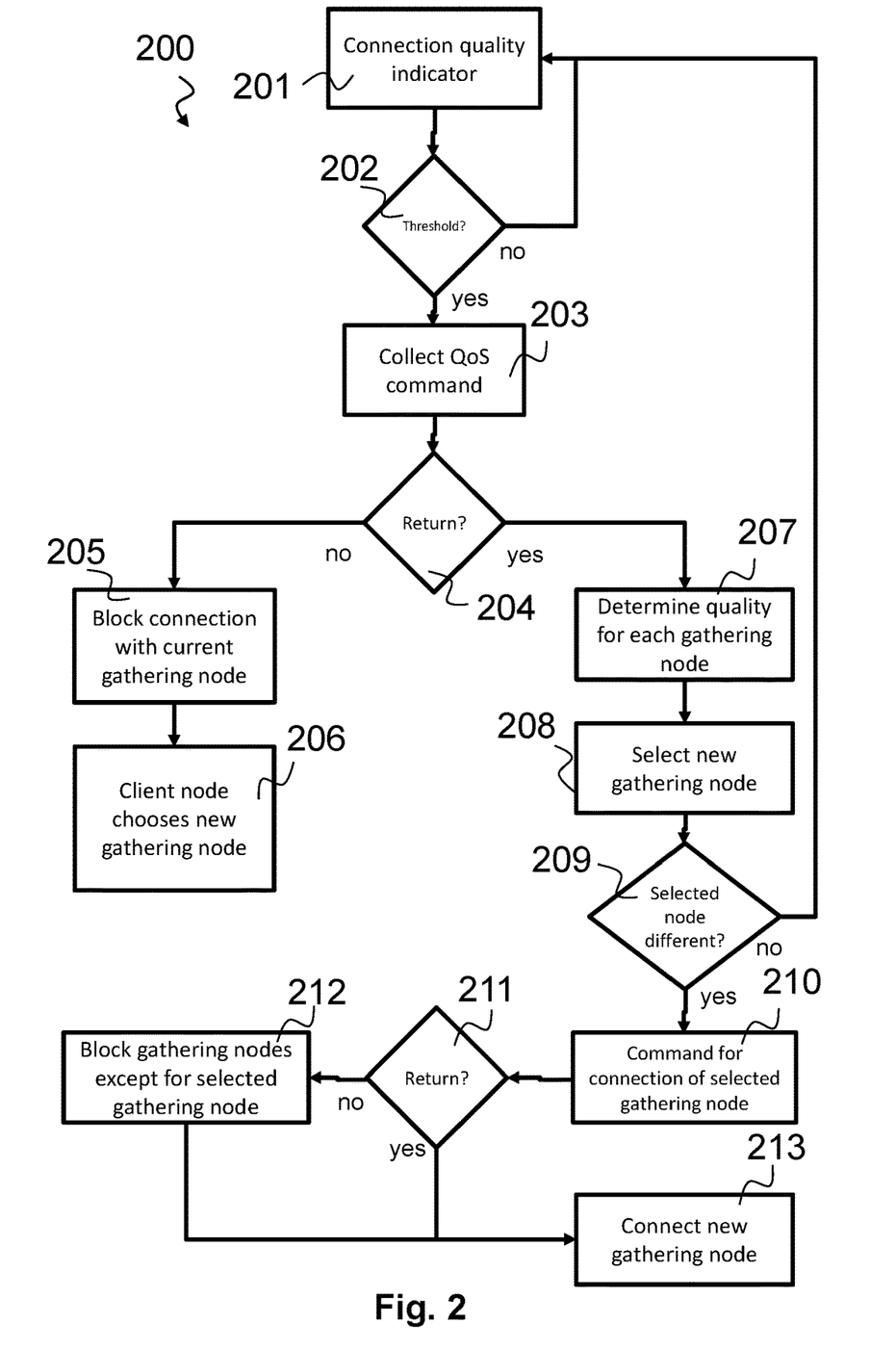
FIG. 2 illustrates schematically a method for managing a connection of a client node to a distributed wireless communication network, according to a first embodiment of the invention.

FIG. 2 illustrates schematically a method 200 for managing a connection of a client node, for example the client node C1 or C2 in FIG. 1, to a distributed wireless communication network, for example the network 100, according to a first embodiment of the invention.

The method 200 is executed by a management node of the network 100, the management node possibly being one or other of the gathering nodes of the network 100. Possibly, each gathering node may adopt the role of management node. The network 100 may then comprise a method for determining which of the gathering nodes must adopt the functionalities of management node.

The method 200 is possibly executed periodically for each of the connections of the client nodes of the network 100 in order to check regularly whether it is necessary to transfer an existing connection of a client node to one gathering node to another gathering node. Alternatively or in a complementary fashion, the method 200 may be triggered by a predetermined event, for example at the time of the connection of a new client node to the network, when a gathering node determines that it is overloaded, etc.

Possibly, each gathering node periodically determines quality data associated with each of the client-node connections established with said gathering node. These quality data, associated with each connection of a client node to a gathering node, may comprise quality data of the following type:
  reception power of a radio signal received from a client node connected to the gathering node (or RSSI, standing for received signal strength indication),
  low-level transmission rate (or transmission rate of the physical layer) of a connection established with a client node (or "PhyRate" standing for "physical rate"),
  usage time of the connection by the client node (or "air time usage"), this usage time of the connection corresponds to quality data hereinafter referred to as "airTime Usage",
  number of frames transmitted after one or more retransmissions ("frame retries").

Each gathering node of the network 100 may be connected to a communication bus, for example a secure software communication bus as described in the patent application WO 2013/087894 A1 published on Jun. 20, 2013. Thus the gathering nodes may periodically exchange with each other the quality data gathered by each gathering node and form a database distributed or replicated by each gathering node comprising, for each gathering node, all the quality data collected.

In a first step 201, the management node determines a connection quality indicator associated with a client node connected to a first gathering node, the connection quality indicator representing a quality of the connection between the first gathering node and the client node. In other words, the management node, for each connection established in the network 100, or on a selection of these connections, determines a quality indicator associated with the connection. According to one embodiment of the invention, this quality indicator, referred to as "ScoreStation", can be determined in accordance with the following formula for a given connection:

ScoreStation=coef1×RSSI+coef2×PhyRate, with:

"ScoreStation": indicator of quality of a connection between a client node and a gathering node,
"coef1": first weighting coefficient,
"coef2": second weighting coefficient,
"RSSI": reception power of a radio signal sent by the client node and received by the first gathering node,
"PhyRate": low-level transmission rate of the connection.

According to one embodiment of the invention, the weighting coefficients "coef1" and "coef2" may be predetermined. According to another embodiment of the invention, the weighting coefficients "coef1" and "coef2" are determined by the formulae:
  (1) if the connection is active, that is to say the client node is exchanging data with the gathering node, then the quality data "airTimeUsage" is positive, and:

Coef1=Coef2=PhyRate Threshold/RSSIThreshold, with:

"PhyRate Threshold": predetermined value of the low-level transmission rate of the connection, typically chosen in the range [26; 52],
  "RSSIThreshold": predetermined value of the reception power of a radio signal sent by the client node and received by the first gathering node, typically chosen in the range [−80; −65].
  (2) if the connection is inactive, that is to say if the client node is not exchanging data with the gathering node (in other words, the client node is "asleep"), then the quality data "airTimeUsage" is zero and:
  Coef1=1/RSSIThreshold, and
  Coef2=0.

The weighting of the coefficients Coef1 and Coef2 makes it possible to cover the cases where the client node is active or asleep.

The value of the parameter "RSSIThreshold" being here chosen in a range of negative values, the coefficients Coef1 and Coef2 are therefore negative. Thus a degradation of the connection quality results in an increase in the value of the quality indicator "ScoreStation".

Thus, in this first step 201, the management node determines a quality indicator, for example the quality indicator "ScoreStation" described above, associated with the connection of the client node with the first gathering node.

In a following step 202, the management node determines whether the connection quality indicator determined in the previous step is above a predetermined threshold, this exceeded threshold representing a poor quality of the connection. In other words, in this first step 202, the management node determines whether the quality indicator determined in the step 201 is indicative of a poor connection quality or not. For this purpose, a minimum quality threshold is predefined.

In the case of the use of the quality indicator "ScoreStation" previously described, and according to one embodiment of the invention, the minimum quality threshold, hereinafter "ScoreThreshold", is variable and determined thus:
  if airTimeUsage=0, then Score Threshold=1, or
  if airTimeUsage>0, then Score Threshold=k, with k<1.

Thus the minimum value of the quality threshold is determined according to the activity of the client node.

Thus, if the connection quality indicator determined in the previous step is above a predetermined threshold, or determined according to the formulae described above, the management node determines that the connection quality between the client node and the first gathering node is not satisfactory and that it is necessary to continue the method in a step 203 in order possibly to select a better gathering node for establishing a new connection. If on the other hand the management node determines, in the step 202, that the quality of the connection is satisfactory, then the management node can stop the method 200 or resume the step 201, the latter then being able to be performed periodically. It is in this case not necessary to transfer the connection to another gathering node.

In a step 203, the management node having determined in the step 202 that the quality of the connection is unsatisfactory, the management node sends, to the client node, a command for determining quality data associated with each gathering node. In other words, the management node sends a command to the client node so that the latter collects quality data associated with the gathering nodes. Thus the client node can, for each gathering node, determine quality data associated with this gathering node. The command for determining quality data associated with each gathering node is typically a command included in the IEEE 802.11k protocol. Consequently the client node, if it is not compatible or compliant with IEEE 802.11k, may not know how to interpret the command received and, in this case, may ignore it or respond with an error message. In this case, the management node passes to the step 205. If on the other hand the client node can correctly interpret and respond to the command sent in the step 203, the management node passes to the step 207.

The step 205 corresponds to the case of a client node not being able to interpret the command received in the step 203, and ultimately therefore not being able to collect quality data from the gathering nodes. In this case, the management node cannot determine or select a better gathering node for establishing the connection with the client node, and the responsibility for determining this possible gathering node is therefore left to the client node through normal mechanisms. The step 205 therefore comprises the sending, by the management node, and intended for the first gathering node, of a command for blocking the connections of the client node (or command refusing connection). In other words, the management node sends a command, to the first gathering node, for blocking (or "blacklisting") the client node. On reception of this command, the first gathering node deauthenticates and/or disassociates, or in other words disconnects, the client node, and then refuses, possibly for a predetermined time, any reconnection request from the client node. The client node, no longer being able to connect to the first client node, chooses, in a step 206, a new gathering node for connecting itself, the selection taking place in accordance with a known method.

It should be noted that, in the case where a plurality of frequency bands can be used ("band steering"), the blocking (step 205) may concern only one frequency band, the one that is used initially for establishing the connection. The client node may therefore possibly be led to reconnect to the first gathering node in the step 206, but then using another frequency band. At the end of the step 206, the client node is therefore connected to a new gathering node, but this new gathering node has however been selected not by the management node but solely by the client node according to a known method.

The step 207 corresponds to the case where the client node is able to interpret and respond to the command sent by the management node in the step 203. In other words, this step corresponds to a client node compatible or compliant with the IEEE 802.11k protocol.

In this step 207, as described in the IEEE 802.11k protocol, the client node can collect quality data from the gathering nodes according to the radio signals captured by the client node, and then send, to the management node, a report containing quality data associated with each gathering node. The management node receives this report and, for each gathering node, can determine a quality indicator, this quality indicator representing a potential quality of connection between said gathering node and the client node. These quality data are associated with an identifier particular to each gathering node (for example an address of the MAC (media access control) type.

The quality indicator can be determined according to quality data collected and then sent by the client node, for example an indicator of the RSSI type associated with each gathering node.

The management node may also combine the quality data received in the step 207 with other quality data collected moreover directly or indirectly from the gathering nodes. These quality data associated with the gathering nodes may comprise the load on the gathering node, the use of an available bandwidth or any other quality data associated with a gathering node. In other words, the quality indicator associated with each gathering node may be determined by the management node according to quality data received in the step 207, issuing from measurements by the client node, but also quality data particular to the backhaul network.

In a following step 208, the management node selects the best gathering node for establishing a new connection with the client node according to the quality indicators previously determined (step 207).

In a following step 209, if this gathering node proves to be the first node, then it is not necessary to transfer the connection from the client node to a new gathering node, and the method passes again, possibly after a pause period, to the initial step 201 in order to be able to react to any variation in the quality of the connection.

In the step 209, if the gathering node selected in the step 208 is a second gathering node different from the first gathering node, then the method passes to the step 210.

In the step 210, the management node sends, to the client node, a command for connection to the second gathering node, the command comprising an identifier of the second gathering node. This command is typically a command described in the IEEE 802.11v protocol.

Depending on whether the client node is compliant or compatible with the IEEE 802.11v protocol, this client node, in a step 211, may send a response compliant or not with the command sent by the management node in the step 210. In other words, if the client node can interpret and respond to the command for connection to the second gathering node, then the client node ends the connection with the first gathering node and establishes a connection with the second gathering node in a step 213.

In the contrary case, then the management node sends, to each gathering node of the distributed communication network, apart from the second gathering node, a command for refusing association with the client node (or blocking or "blacklisting"). Thus, since each node, including the first gathering node, refuses any request for connection coming from the client node, the latter has no other choice, in the step 213, than to connect to the second gathering node.

Thus, for a client node compliant or compatible with the 802.11k protocol, the method 200 enables the network, that is to say the management node, to select an optimum gathering node for establishing a connection with the client node.

In the case where the client node is not compliant or compatible with the 802.11k protocol, then the method 200 allows the client node to select alone a new gathering node (step 206) when it is judged (step 202) that the quality of connection with the first gathering node is unsatisfactory.

Figure 3:
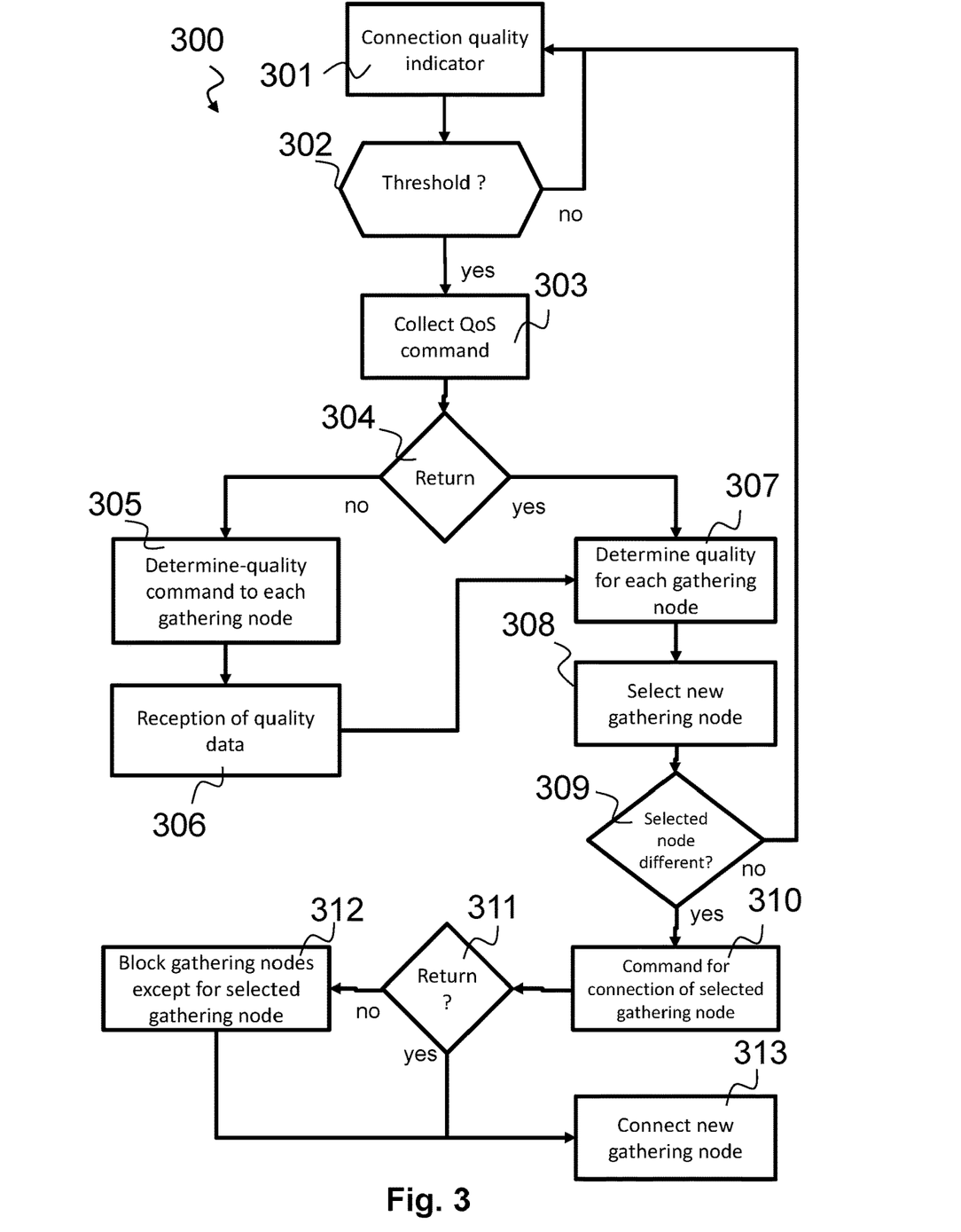
FIG. 3 illustrates schematically a method for managing a connection of a client node to a distributed wireless communication network, according to a second embodiment of the invention.

FIG. 3 illustrates schematically a method 300 for managing a connection of a client node to a distributed wireless communication network, according to a second embodiment of the invention.

The method 300 begins in an identical fashion to the method 200, the steps 301 to 304 being respectively identical to the steps 201 to 204.

The case where the client node is compliant or compatible with the IEEE 802.11k protocol, that is to say the branch of the method 300 comprising the steps 307 to 313 is identical to the branch of the method 200 comprising the corresponding steps 207 to 213.

On the other hand, in the method 300, the case where the client node is not compliant or compatible with the IEEE 802.11k protocol, that is to say the branch comprising the steps 305 and 306, differs from the corresponding branch (steps 205 and 206) of the method 200.

This is because the steps 305 and 306 relate to palliative steps enabling the network 100, that is to say the management node, ultimately to determine a better gathering node. In other words, unlike the method 200, it is in this case not the client node alone that selects the gathering node in order to establish a new connection. On the contrary, in the method 300, it is the management node that ultimately selects the gathering node.

For this purpose, in a step 305, the management node sends, to each gathering node, except for the first gathering node, a command to activate the determination of a quality data item associated with the client node and with said gathering node, the command comprising an identifier of the client node.

Thus each gathering node, comprising at least one radio module compliant with an IEEE 802.1 standard, receiving this activation command is adapted for determining a quality data item associated with a client node identified by the identifier. For this purpose, each gathering node is adapted for:

moving the radio module into a so-called monitoring mode in order to capture frames comprising the identifier of the client node, and/or filtering frames received according to the identifier of the client node.

The quality data item may correspond to a received power of a radio signal corresponding to frames sent by client node and captured or received by the gathering node, for example an RSSI.

According to one embodiment of the invention, if the client node is asleep, that is to say is not using its connection—and is therefore not sending any frames that can be captured by the gathering node—, then the management node, or one of the gathering nodes, can activate said client node by sending predetermined messages (for example messages known as "pings").

In other words, in the step 305, the client node not being compatible or compliant with the IEEE 802.11k protocol, and therefore not being able to collect quality data associated with the gathering nodes, the gathering nodes are therefore requested to themselves collect quality data associated with the client node. The method 300 is therefore compatible with any so-called legacy Wi-Fi node or electronic device, that is to say one not integrating the last IEEE 802.11k or 802.11v revisions of the Wi-Fi (or IEEE 802.11) standards.

In the following step 306, the management node therefore receives, coming from each gathering node, a message comprising the quality data associated with the client node and with said gathering node. The management node can then execute the steps 307, quality data having been received, and determine quality indicators for each gathering node. In the method 300, unlike the method 200, the step 307 making it possible to determine, for each gathering node, a quality indicator associated with the client node according to the quality data received, can be executed, whether the client node is compliant or compatible with the IEEE 802.11k protocol (steps 304 and then 307) or not (steps 304, 305, 306 and 307).

Figure 4:
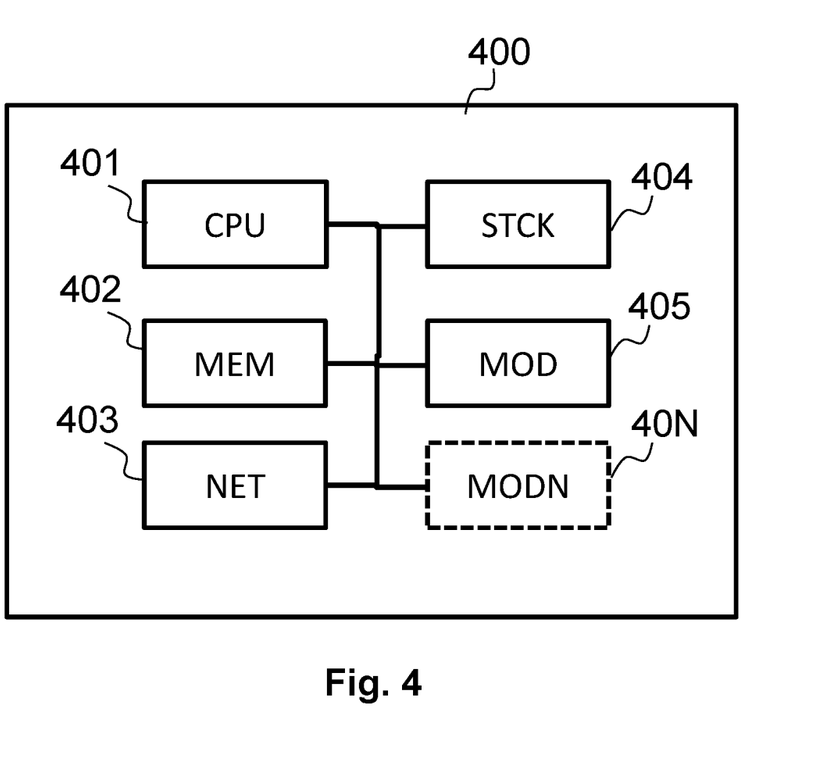
FIG. 4 illustrates schematically the hardware architecture of a gathering node of a distributed wireless communication network, the gathering node being adapted for performing all or some of the steps of the method illustrated in FIG. 2 or in FIG. 3.

FIG. 4 illustrates schematically the hardware architecture of an electronic device or management node of a distributed wireless communication network, the management node being able to be one of the gathering nodes B1, B2, B3, B4 or B5 illustrated in FIG. 1 and being adapted for executing all or some of the steps of the method 200 or 300 illustrated in FIG. 2 or in FIG. 3.

Thus the electronic device 400 comprises, connected by a communication bus: a processor or CPU (central processing unit) 401; a memory MEM 402 of the RAM (random access memory) and/or ROM (read only memory) type, possibly a network module NET 403, for example of the Ethernet type, a storage module STCK 404 of the internal storage type and possibly a plurality of radio-frequency modules 405 to 40N compliant with a standard of the IEEE 802.11 type. The storage module STCK 404 may be of the hard disk HDD type (hard disk drive) or SSD type (solid state drive), or of the external storage medium reader type, such as an SD (Secure Digital) card reader. The processor CPU 404 can record data, or information, in the memory MEM 402 or in the storage module STCK 404. The processor CPU 401 can read data recorded in the memory MEM 402 or in the storage module STCK 404. These data may correspond to configuration parameters. The network module NET 503, if present, typically allows connection of the electronic device 400 to a local network and/or the internet. Each radio-frequency module 405 to 40N enables the electronic device 400 to establish a plurality of radio-frequency interfaces compliant with a so-called Wi-Fi standard. The Wi-Fi standard may be IEEE 802.11k and/or IEEE 802.11v. A radio-frequency interface may be a Wi-Fi access point, or on the other hand a so-called user radio-frequency interface allowing an association with a radio-frequency interface known as an access point of another electronic device.

The processor CPU 401 is capable of executing instructions loaded in the memory MEM 402, for example from the storage module STCK 404. When the electronic device 400 is powered up, the processor CPU 401 is capable of reading instructions from the memory MEM 402 and executing them. These instructions form a computer program causing the implementation, by the processor CPU 401, of all or some of the methods and steps described above, particularly the method described in FIG. 2 or the method described in FIG. 3. Thus all or some of the methods and steps described above can be implemented in software form by the execution of a set of instructions by a programmable machine, such as a DSP (digital signal processor) or a microcontroller. All or some of the methods and steps described here can also be implemented in hardware form by a machine or a dedicated component, such as an FPGA (field-programmable gate array) or an ASIC (application-specific integrated circuit). The functions of the electronic device 400 can be integrated in a node of a wireless network compliant with an IEEE 802.11 standard by an updating of software, that is to say for example by updating the microprogram (firmware) of the electronic device 400.

The invention claimed is:

1. A method, for a distributed wireless communication network comprising a plurality of gathering nodes and at least one client node connected to a first gathering node, for managing the connection of this client node, said method causing a so-called management node to perform:
    determining a connection quality indicator associated with the client node, the connection quality indicator representing a quality of the connection between the first gathering node and the client node,
    if the connection quality indicator is above a predetermined threshold, this exceeded threshold representing a poor quality of the connection, then:
    sending, to each gathering node, except for the first gathering node, a command to activate the determination of a quality data item associated with the client node and with said gathering node, the command comprising an identifier of the client node,
    receiving, coming from each gathering node, a message comprising the quality data associated with the client node and with said gathering node,
    determining, for each gathering node, a quality indicator associated with the client node according to the quality data received,
    selecting a second gathering node according to the quality indicators determined, and
    wherein, when determined that the second gathering node is different from the first gathering node, then:
    sending, to each gathering node of the distributed communication network, apart from the second gathering node, a command refusing association with the client node.

2. The method according to claim 1, for which, if the second gathering node is different from the first gathering node, then the method said method causing the so-called management node to perform:
    sending, to the client node, a command to connect to the second gathering node, the command comprising an identifier of the second gathering node,
    the step of sending, to each gathering node of the distributed communication network, apart from the second gathering node, a command refusing association with the client node being performed only in the absence of acceptance by the client node of the previous command for connection to the second gathering node.

3. The method according to claim 1, for which, if the connection quality indicator is above a predetermined threshold, this exceeded threshold representing a poor quality of the connection, then the method causing the so-called management node to perform:
    sending, to the client node, a command for determining quality data associated with each gathering node,
    the steps of sending, to each gathering node, apart from the first gathering node, an activation command for determining quality data associated with the client node and with said gathering node and for receiving, coming from each gathering node, a message comprising the quality data associated with the client node and with said gathering node, being performed only in the absence of acceptance by the client node of the previous command for determining the quality data associated with each gathering node.

4. The method according to claim 1, each gathering node being connected to the same communication bus, each gathering node collecting, for each client node connected to said gathering node, quality data.

5. The method according to claim 1, the so-called management node being one of the gathering nodes.

6. The method according to claim 1, the distributed wireless communication network being compliant with an IEEE 802.11 standard.

7. A management node of a distributed wireless communication network, the communication network comprising a plurality of gathering nodes, wherein the management node is adapted for executing the steps of the method according to claim 1.

8. The method according to claim 1, wherein the method further causing a gathering node to perform:
    receiving, coming from a so-called management node, a command for activating the determination of quality data associated with the client node, the command comprising an identifier of the client node,
    determining the quality data associated with the client node,
    sending, to the management node, a message comprising the quality data associated with the client node and with the gathering node.

9. The method according to claim 8, the gathering node comprising at least one radio module compliant with an IEEE 802.11 standard, the determining the quality data associated with the client node comprising:
    changing the radio module to a so-called monitoring mode in order to capture frames comprising the identifier of the client node, and/or
    filtering frames received according to the identifier of the client node,
    the quality data corresponds to a received power of a radio signal corresponding to the frames captured or received.

10. A system, for a distributed wireless communication network comprising a plurality of gathering nodes and at least one client node connected to a first gathering node, for managing the connection of this client node, a so-called management node, the system comprising circuitry causing the system to perform:
    determining a connection quality indicator associated with the client node, the connection quality indicator representing a quality of the connection between the first gathering node and the client node,
    if the connection quality indicator is above a predetermined threshold, this exceeded threshold representing a poor quality of the connection, then the client node activates circuitry causing the client node to perform:
    sending, to each gathering node, except for the first gathering node, a command to activate the determination of a quality data item associated with the client node and with said gathering node, the command comprising an identifier of the client node,
    receiving, coming from each gathering node, a message comprising the quality data associated with the client node and with said gathering node, determining, for each gathering node, a quality indicator associated with the client node according to the quality data received, and selecting a second gathering node according to the quality indicators determined, and wherein, when determined that the second gathering node is different from the first gathering node:

sending, to each gathering node of the distributed communication network, apart from the second gathering node, a command refusing association with the client node, and each gathering node comprises circuitry causing the gathering node to perform:

receiving, coming from a so-called management node, a command for activating the determination of quality data associated with the client node, the command comprising an identifier of the client node, determining the quality data associated with the client node, and sending, to the management node, a message comprising the quality data associated with the client node and with the gathering node.

11. A nontransitory recording medium embodying a computer program that it that comprises instructions for implementing, by a processor of a management node of a distributed wireless communication network comprising a plurality of gathering nodes, the method according to claim 1, when the computer program is executed by the processor.

* * * * *